United States Patent [19]
Miller

[11] Patent Number: 5,943,817
[45] Date of Patent: Aug. 31, 1999

[54] BAIT HOLDER AND TRAP FOR PESTS HAVING A REMOVABLE BAIT HOLDING TRAY

[75] Inventor: Albert Miller, San Jose, Calif.

[73] Assignee: Terminator Turtle LP, Alameda, Calif.

[21] Appl. No.: 09/093,158

[22] Filed: Jun. 8, 1998

Related U.S. Application Data

[62] Division of application No. 08/726,771, Oct. 7, 1996.

[51] Int. Cl.$^6$ ..................................................... A01M 1/02
[52] U.S. Cl. .............................................................. 43/131
[58] Field of Search .................... 43/131, 121; D22/119, D22/122; 220/315, 328; 206/457

[56] References Cited

U.S. PATENT DOCUMENTS

| 3,550,308 | 12/1970 | Ibach | 43/121 |
|---|---|---|---|
| 4,026,064 | 5/1977 | Baker | 43/131 |
| 4,228,613 | 10/1980 | Kalnasy | 43/131 |
| 4,395,842 | 8/1983 | Margulies | 43/114 |
| 4,438,584 | 3/1984 | Baker et al. | 43/58 |
| 4,550,525 | 11/1985 | Baker | 43/131 |
| 4,637,162 | 1/1987 | Sherman | 43/131 |
| 4,660,320 | 4/1987 | Baker | 43/131 |
| 4,666,767 | 5/1987 | Von Kohorn et al. | 428/304.4 |
| 4,747,230 | 5/1988 | Zalesky | 43/121 |
| 4,761,912 | 8/1988 | Dyer | 43/121 |
| 5,040,327 | 8/1991 | Stack | 43/131 |
| 5,123,202 | 6/1992 | Tanisake | 43/131 |
| 5,175,958 | 1/1993 | Wedemeyer | 43/121 |
| 5,272,832 | 12/1993 | Marshall | 43/131 |
| 5,657,575 | 8/1997 | Miller et al. | 43/131 |
| 5,806,237 | 9/1998 | Nelson | 43/131 |

Primary Examiner—Kurt Rowan
Attorney, Agent, or Firm—Jack M. Wiseman

[57] ABSTRACT

A snail bait holder and pest trap in which a removably attached cover is seated on a vessel to form a bait chamber. An impervious replaceable tray is positioned in the bait chamber. The tray has a receptacle and contained within the receptacle of the tray is a layer of liquid adhesive. Disposed on the layer of liquid adhesive within the receptacle is a layer of bait material which adheres to the layer of liquid adhesive. Vessel walls are cut away to form ramps and openings for pests to travel over the ramps through the openings and into the bait chamber. The tray containing the bait and liquid adhesive is packaged for placement in the bait chamber with a thin film disposed over the tray. Before the tray with the bait and liquid adhesive is placed in the bait chamber, the thin film is removed from the tray.

3 Claims, 5 Drawing Sheets

BAIT HOLDER AND TRAP FOR PESTS HAVING A REMOVABLE BAIT HOLDING TRAY

This application is a divisional application of application Ser. No. 08/726,771 filed on Oct. 7, 1996, by Albert Miller for Bait Holder And Trap For Pests Having A Removable Bait Holding Tray.

BACKGROUND OF THE INVENTION

The present invention relates in general to devices for pest control and, more particularly, to a bait holder and a trap for pests.

It has been a common practice to employ bait to kill garden variety of insects. Such bait was in the form of granules, compressed pellets and liquid. Bait for insects were commonly dispersed at the edge of planting areas and among bushes. This procedure presented various problems, namely:

1. Rain, high humidity, and watering reduced the effectiveness of the poisonous bait;

2. It is not desirable to dispose or distribute the poisonous bait during significant winds;

3. The poisonous bait may harm pets and desired wildlife that may be attracted to the bait; and 4. The poisonous bait is usually water soluable and, perhaps, presents a potential environmental problem.

In the U.S. patent to Dyer et al., U.S. Pat. No. 4,761,912, issued on Aug. 9, 1988, for Snail Trap, there is disclosed a trap for snails and slugs. The trap includes a pan-shaped lower vessel and a pan-shaped upper vessel, which form a bait chamber. The base has a central upwardly extending support defining a receptacle for the bait. Snails and slugs can crawl over an annular wall, through a gap and into a concealed poison chamber.

The U.S. patent to Zalesky, U.S. Pat. No. 4,747,230, issued on May 31, 1988, for Slug Trap, discloses a lower vessel and an upper vessel to form a bait chamber. The upper vessel is releasably attached to the lower vessel by a latching arrangement on diametrically opposite sides of the vessels. The upper vessel shields the bait chamber from rain. The upper vessel extends beyond the perimeter of the bait chamber for making the trap resistant to overturning by animals and wind. An annular extending lip provides a ramp for facilitating the ingress of slugs into the bait chamber.

The U.S. patent to Eichmuller et al., U.S. Pat. No. 4,328,637, issued on May 11, 1982, for Snail Trap, discloses a snail trap. The snail trap comprises a pan having a perforated bottom, which seats on the bottom of a snail trap container. An upwardly extending handle of the pan carries a cover and supports it above the open top of the container to serve as a rain shield. The collecting pan is removable from the chamber.

In the U.S. patent to Demarest, U.S. Pat. No. 4,837,969, issued. on Jun. 13, 1989, for Bait Station, there is disclosed an insect bait station. The insect bait station includes an apertured, multi-lobed cover, which is fitted over a base having a central bait well. The central bait well is formed by a ramp structure and inner walls intersecting the ramp structure. An insect travels over the ramp structure to reach the well.

The U.S. patent to Baker et al., U.S. Pat. No. 4,438,584, granted on Mar. 27, 1984, for Trap For Rats, Mice, And Other Vermin discloses an adhesive trap for mice and insects using a pressure sensitive adhesive. A tray has a central indentation into which molten adhesive is poured. The adhesive thickens to provide a tacky layer which will trap, by self-adhesion, vermin coming into contact therewith.

In the patent to Demarest et al., No. 5,033,229, issued on Jul. 23, 1991, for Liquid Delivery Bait Station, there is disclosed a bait station for the control of insects. A base structure for the bait station has a ramped structure around its circumference that defines a central well area. Rising from the ramped structure are a plurality of support walls which support the reservoir portion and define access openings to the central well area. Between the reservoir and the base structure is an absorbent fibrous pad configured to fit within and on the bottom of the central well area.

In the patent to Von Kohorn et al., U.S. Pat. No. 4,666,767, issued on May 19, 1987, there is disclosed a dispenser comprising a laminated article. The laminated article comprises one or more layers containing active pest control and pest attractant substances. The pest controlling substance within the laminate surfaces on the laminate.

In a pending application filed by Bridget M. Miller and Albert Miller, Ser. No. 08/452,978, filed on May 30, 1995, for Snail Bait Holder And Snail Trap, there is disclosed a snail bait holder and snail trap. The snail bait holder and snail trap has a vessel and a cover which form a snail bait holding chamber. Disposed within the snail bait holding chamber is a laminated disc for supporting the snail bait. An upper layer of the laminated disc is made of a liquid absorbent material on which is deposited a slurry of snail bait. A lower layer of the laminated disc is made of a non-absorbent, flexible material so that mounds of snail bait are disposed on the upper layer. The vessel has an upwardly directed wall which is cut out to form openings. The cutout sections of the wall are bent outwardly and downwardly to form a ramp over which a snail travels to enter the snail bait holding chamber. The assignee of the present application is also the assignee of the pending application Ser. No. 08/452,978.

SUMMARY OF THE INVENTION

A bait holder comprising a vessel and cover which form a bait holding chamber. Disposed within the bait holding chamber is a removable, liquid-impervious tray. Disposed within a receptacle of the removable, liquid-impervious tray is a lower layer of liquid adhesive. Disposed on the layer of liquid adhesive and adhering thereto is an upper layer of bait granules, or the like.

An object of the present invention is to provide a bait holder that inhibits pets and desired wildlife from access to the bait disposed within a bait holding chamber.

Another object of the present invention is to provide a bait holder that inhibits the bait from being subject to rain, watering, winds, and the like.

Another object of the present invention is to provide a bait holder wherein a removable and disposable tray containing bait is packaged for facilitating the placement in and removal from the bait holder.

A feature of the present invention is to provide a bait holder comprising a tray. Disposed within the tray is an upper layer of bait and a lower layer made of liquid adhesive, which retains the bait of the upper layer on the tray.

Another object of the present invention is to provide a tray for a bait holder that is packaged for delivery and shipment for use in a bait holder, which tray contains bait.

DESCRIPTION OF THE PREFERRED EMBODIMENT

Figure 1:
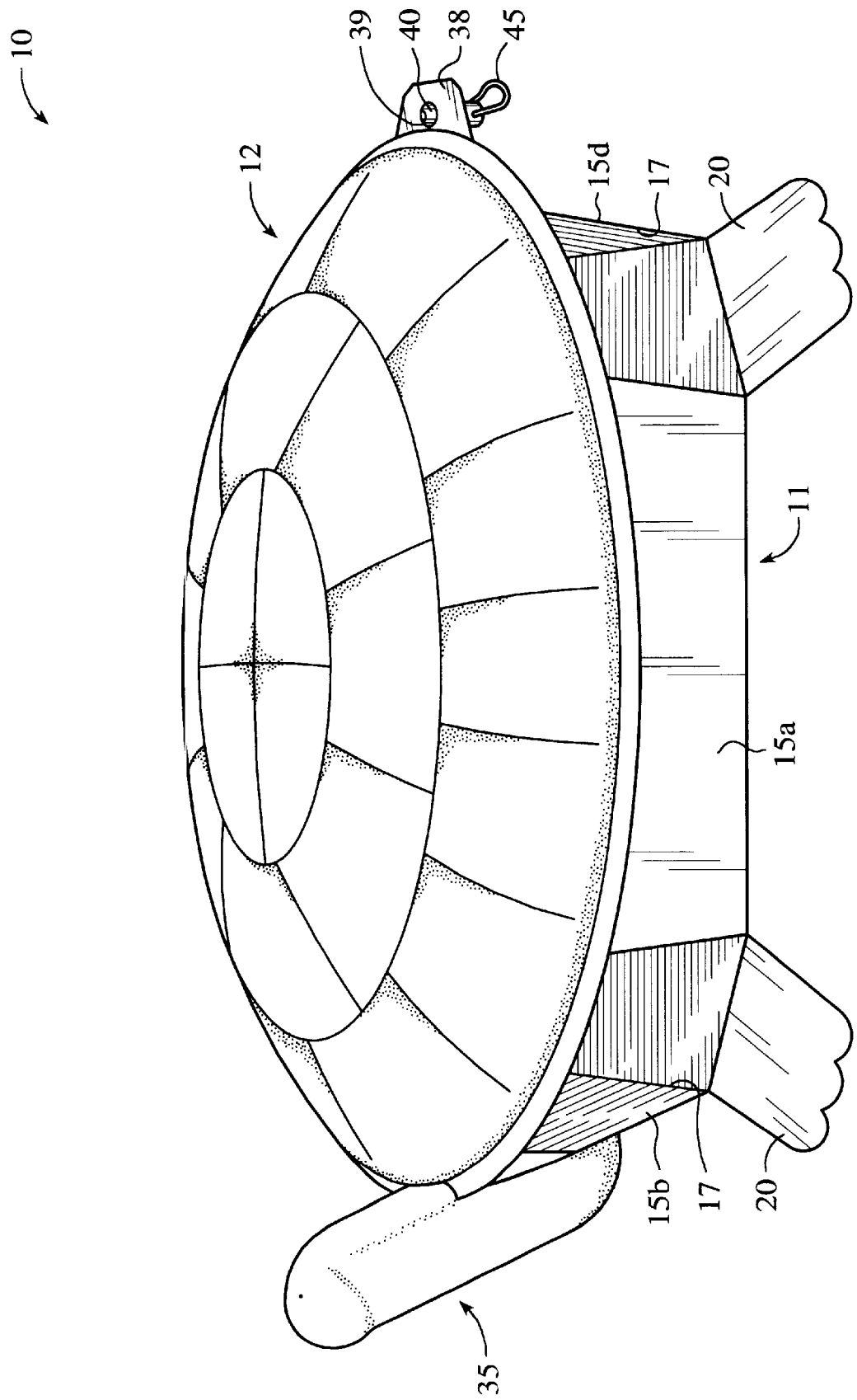
FIG. 1 is a side elevational view of a bait holder and pest trap embodying the present invention.
Figure 2:
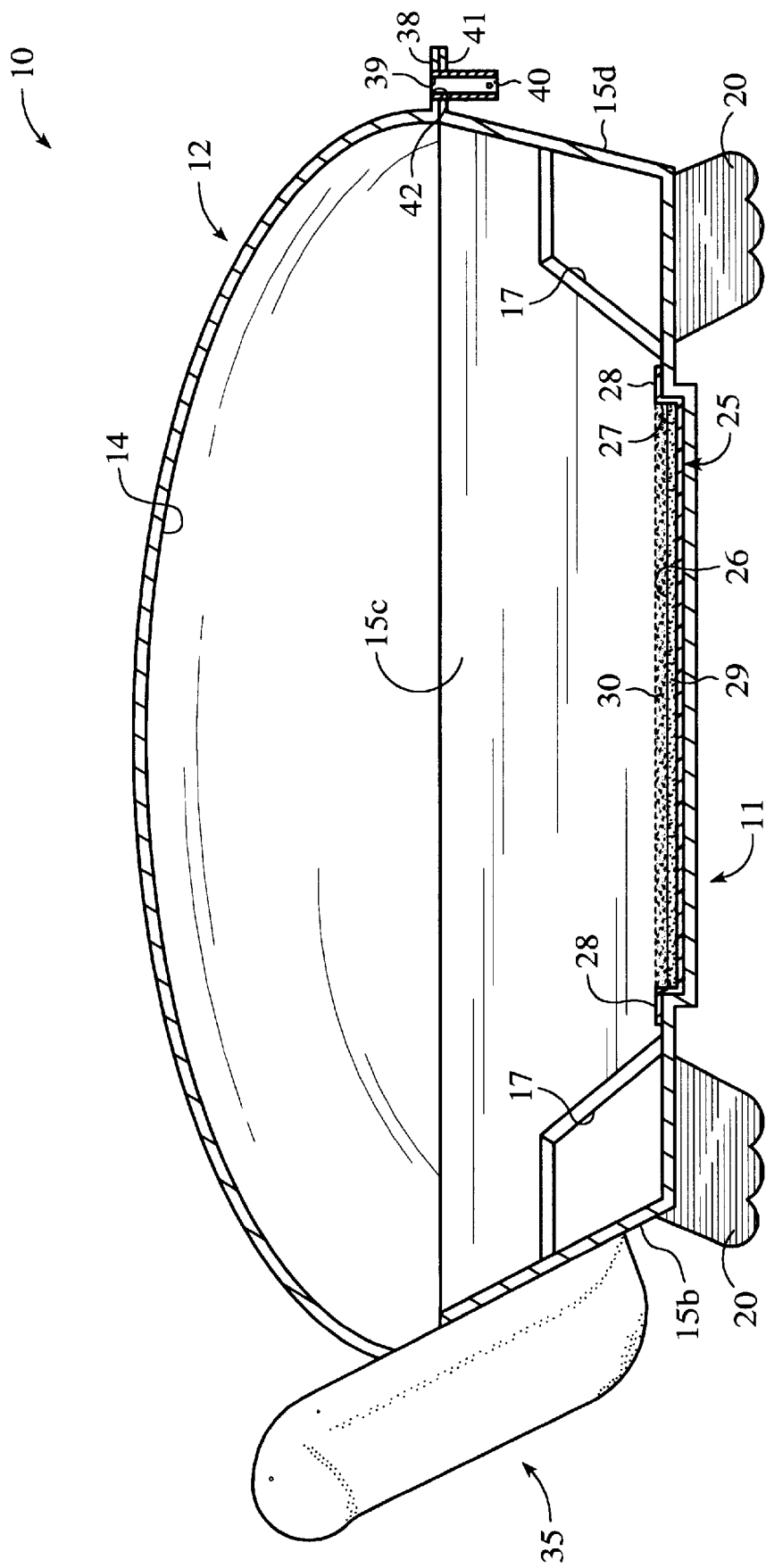
FIG. 2 is a vertical sectional view of the bait holder and pest trap shown in FIG. 1 taken the longitudinal centerline of FIG. 1.

Illustrated in FIGS. 1–3 and 5 is a bait holder and trap 10, which comprises a vessel 11 and a hollow cover 12. The vessel 11 and the cover 12 are made of suitable material, such as light weight steel. It is apparent that the vessel 11 and the cover 12 can be made of plastic, aluminum or the like. In the exemplary embodiment, the vessel 11 has a pan-like configuration and the cover 12, in the exemplary embodiment, has a generally hemispherical configuration. It is apparent that the cover 12 can have an inverted pan-like configuration. When the cover 12 is supported by the vessel 11, they form a bait holding chamber 14 (FIG. 2). The vessel 11 includes generally upright walls 15a–15d. The walls 15b and 15c are slightly inclined outwardly. The upright walls 15a, 15c and 15d are formed with flanges 15e, 15f and 15g, respectively. The cover 12 seats on the flanges 15e, 15f and 15g of the upright walls 15a and 15d. The cover 12 is disposed over and surrounds the upper rim of the vessel 11 in overlapping relation to be supported thereby. Defined by the upright walls 15a–15d are openings 17. Sections of the upright walls 15a–15d are cut out to form the openings 17 and are bent outwardly and downwardly to form ramps 20. The cutout sections of the upwardly directed walls 15a–15d have a width sufficient in dimension to enable a pest to travel up the ramps 20 and pass through the openings 17 to enter the bait holding chamber 14. The cutout sections of the upwardly directed walls 15a–15d have a length sufficient in dimension so that the ramps 20 engage the supporting surface and extend a sufficient distance below the base of the vessel 11 to serve as legs for the snail bait holder 10. The dimensions of the openings 17 are sufficiently small to prevent cats, dogs and the like from having access to the bait holding chamber 14. In the exemplary embodiment, there are four ramps 20 and four openings 17.

Figure 3:
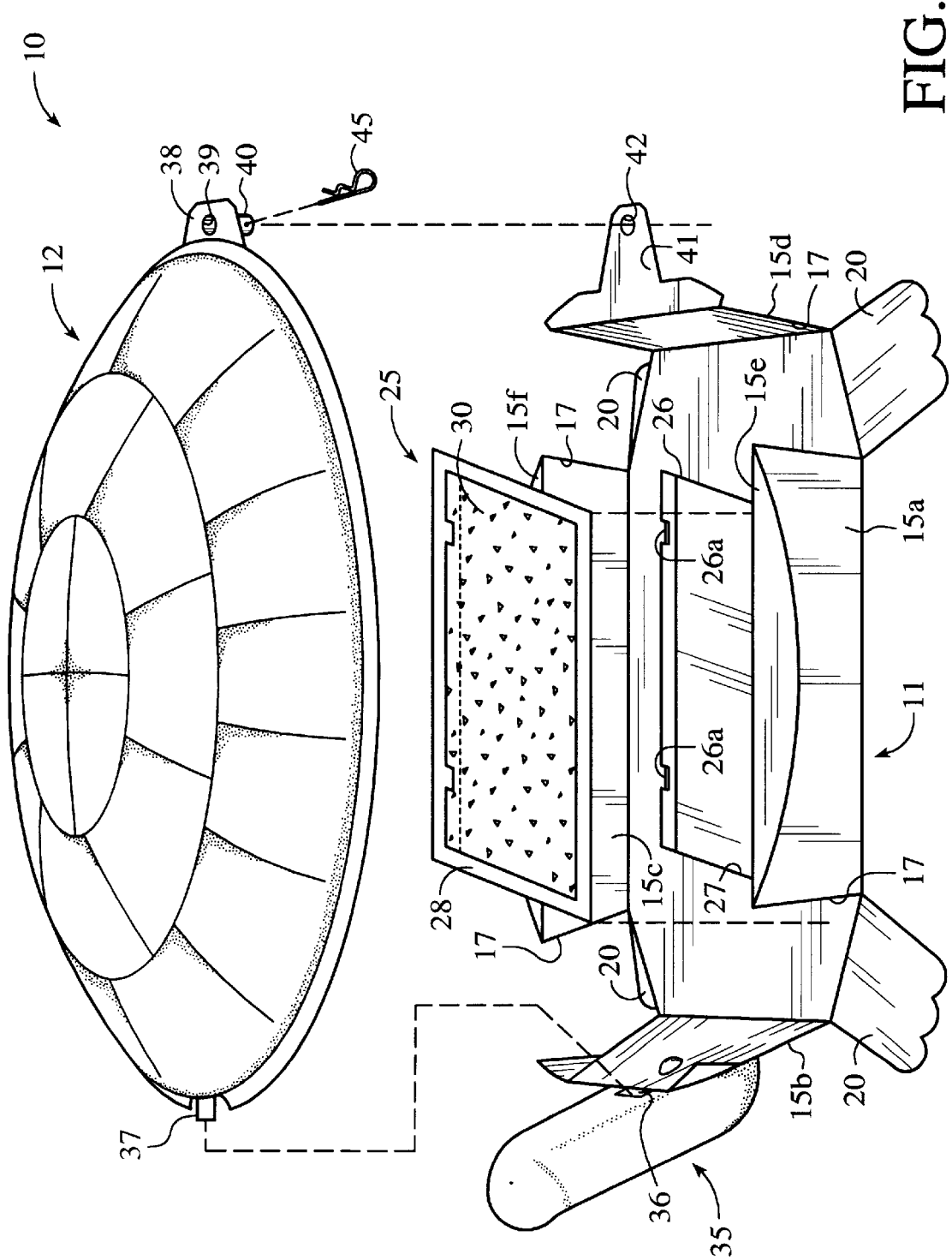
FIG. 3 is an exploded view of the bait holder and pest trap shown in FIGS. 1 and 2.
Figure 4:
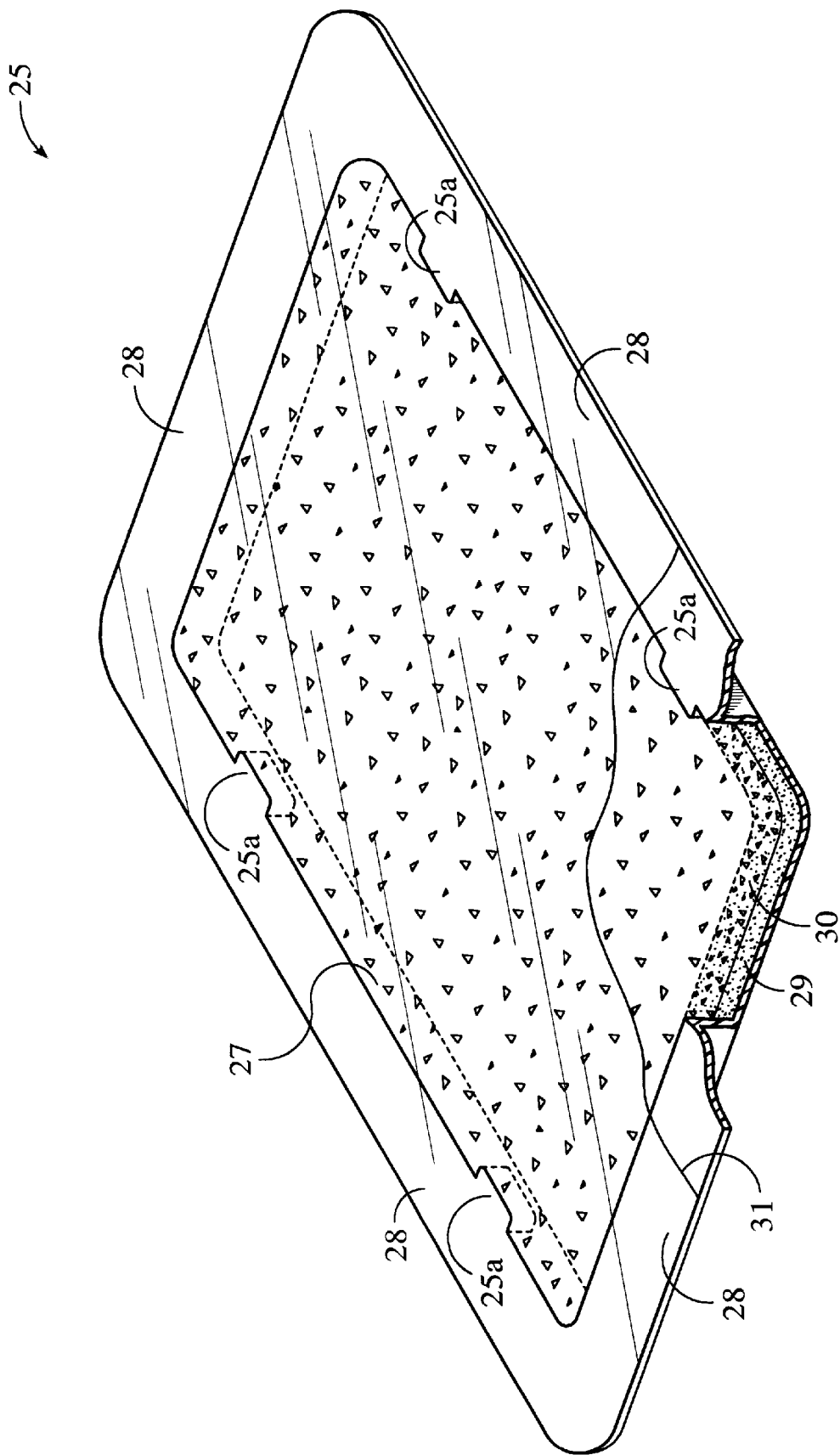
FIG. 4 is a fragmentary perspective view of a tray employed in the present invention containing bait, which tray is broken away to illustrate an upper layer of bait granules and a lower layer of liquid adhesive, packaged for delivery a shipment for use in a bait holder.
Figure 5:
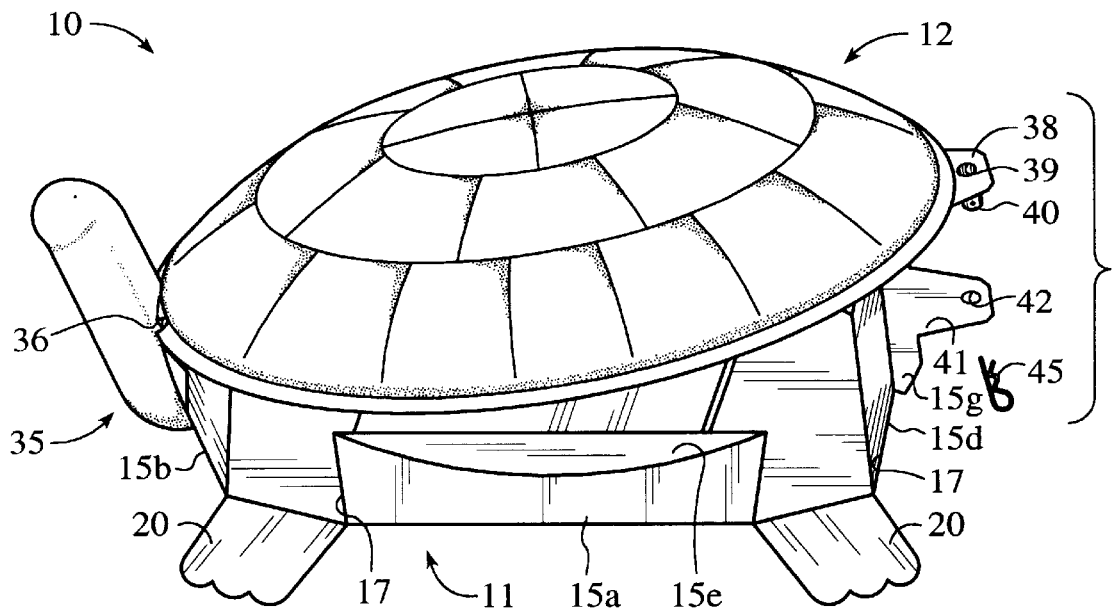
FIG. 5 is an elevation view of the bait holder and pest trap shown in FIGS. 1–3 with a cover slightly tilted from a vessel illustrating the arrangement for removably securing the cover of the bait holder and pest trap to the vessel of the bait holder and pest trap.

Disposed within the bait holding chamber 14 and seated on the base of the vessel 11 is a substantially liquid-impervious tray 25 (FIGS. 2–4). The tray 25 may be of a suitable plastic, such as polyvinylchloride or styrene plastic. The tray 25 is seated in a rectangular recessed area 26 (FIG. 3) of the base of the vessel 11. In the exemplary embodiment, the tray 25 has walls forming a rectangular receptacle 27. Surrounding the rectangular receptacle 27 are side and end flanges 28. Formed in the walls of the tray 25 below the flanges 28 are indentations 25a. Projections 26a extending from the walls forming the recessed area 26 are received by the indentations 25a, respectively, of the tray 25 for aligning and removably securing the tray 25 within the rectangular recessed area 26 (FIGS. 3 and 4).

In the preferred embodiment, disposed within the receptable 27 of the tray 25 (FIGS. 2 and 4) is a lower layer 29 of, clear water based adhesive. The liquid adhesive employed for the layer 29 is of the type manufactured and sold by Minnesota Mining And Manufacturing Company of Minneapolis, Minn., as the Scotch Grip Adhesive 4224-NF.

Disposed as an upper layer 30 in the receptacle 27 of the tray 25 are bait granules. In the exemplary embodiment, the bait granules used to form the upper layer 30 are suitable commercially available bait granules, or the like. The lower layer 29 of liquid adhesive holds the bait of the upper layer 30 in place within the tray 25. The particular bait employed is dependent on the pest to be destroyed. The dimensions of the bait holder and pest trap 10 is dependent on the size of the pest to be destroyed.

When the pest to be trapped and destroyed within the bait holder and trap 10 is a snail, slug or the like, bait, in the preferred embodiment, are granules used to form the upper layer 30. Suitable bait granules for snails, slugs, or the like are manufactured and sold by Pace International LP of Kirkland, Washington, as the DEADLINE snail bait granules. Metaldehyde has been commonly employed as a component of snail bait. In the exemplary embodiment, the metaldehyde is 4% by weight of a bait granule. In the exemplary embodiment, the lower layer 29 of the liquid adhesive is 0.05–0.06 inch thick and the upper layer 30 of the insect bait granules is 0.03–0.04 inch thick when the bait is intended for snails, slugs, and the like.

When pests, such as mice or the like, are to be destroyed, the layer 30 comprises granules or the like manufactured by Liphatech, Inc. of Milwaukee, Wis., as the MAKI mice killer. The MAKI mice killer includes bromadiolone. When the pests, such as mice or the like, are to be destroyed, the access area for the granules of the tray 25 are reduced as a safety precaution.

In the preparation of the tray 25, the lower layer 29 of liquid adhesive is disposed therein. Above the lower layer 29 of liquid adhesive is disposed the upper layer 30 of bait. The upper layer 30 of bait is placed on the lower layer of liquid adhesive by scattering or by pressing. In the exemplary embodiment, the tray 25 with the lower layer 29 of liquid adhesive and the upper layer 30 of bait is placed in an oven for approximately 10 minutes with the oven temperature in the range 140° F. to 150° F. After the tray 25 is removed from the oven, a thin transparent film, such as polyethylene film 31, is placed about the tray 25 above the upper layer 30 of bait. The tray 25 is delivered or shipped as a package with the thin film 31 thereover. Before the tray 25 is placed in the bait chamber 14 of the bait holder and insect trap 10, the thin film 31 is removed from the tray 25, thus exposing the upper layer 30 of bait.

The cover 12 is removably attached to the vessel 11 to provide access to the bait chamber 14 for replacing the disposable tray 25. Toward this end, an elongated, hollow member 35, resembling somewhat the head of a turtle, is fixedly attached to the generally upright wall 15b of the vessel 11 by suitable means, such as a rivet or a nut and bolt. Formed in the hollow member 35 confronting the generally upright wall 15b is a horizontal slot 36 (FIG. 3). Projecting from the cover 12 is a tongue 37 (FIG. 3) that is received by the slot 36 when the cover 12 is seated on the vessel 11. A flange 38 (FIGS. 2, 3 and 5) is disposed on the cover 12 directly opposite from the tongue 37. An opening 39 is formed in the flange 38 with an axis perpendicular to the flange 38. Projecting downwardly from the flange 33 and received by the opening 39 is a pin 40. The axis of the pin 40 is perpendicular to the flange 38. Integrally formed with the generally upright wall 15d of the vessel 11 is a generally horizontal flange 41. The flange 41 is directly opposite to the elongated hollow member 35. Formed in the flange 41 is an aperture 42. The axis of the aperture 42 is perpendicular to the flange 41.

When the cover 12 is removably seated on the vessel 11, the tongue 37 is received by the slot 36 of the hollow member 35 and the pin 40 is received by the aperture 42 of the flange 41. Passing through the pin 40 below the flange 41 is a radial bore (FIG. 1). A suitable fastener or clip 45 (FIGS. 1 and 3) passes through the radial bore for releasably securing the cover 12 to the vessel 11. For lifting the cover 12 from the vessel 11 to expose the bait chamber 14, the fastener 45 is removed from the radial bore of the pin 40. Then, the cover 12 is lifted to remove the pin 40 from the aperture 42. Now, the cover 12 is moved to remove the tongue 37 from the slot 36 of the hollow member 35.

Figure 6:
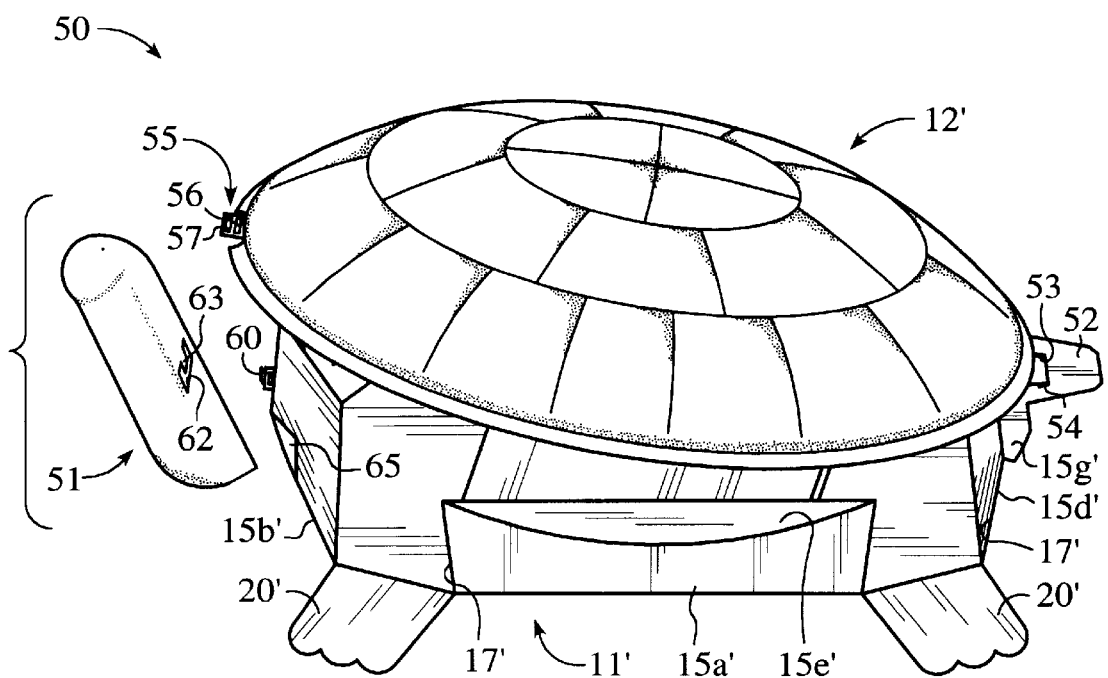
FIG. 6 is an elevation view of a bait holder and pest trap which is a modification of the bait holder and pest trap shown in FIGS. 1–3 and 5 with a cover slightly tilted from a vessel illustrating another arrangement for removably securing the cover of the bait holder and pest trap to the vessel of the bait holder and pest trap.

Illustrated in FIG. 6 is a bait holding and pest trap 50, which is a modification of the bait holding and pest trap 10 shown in FIGS. 1–3 and 5. Parts of the bait holding and pest trap 50 generally corresponding to parts of the bait holding and pest trap 10 will be shown and described with the same reference numeral but with a. prime suffix.

In the bait holding and pest trap 50, an elongated, hollow member or latch 51, resembling somewhat the head of a turtle, is removably attached to the generally upright wall 15b'. At the opposite end of the vessel 11' from the elongated hollow member 51, a horizontal flange 52 projects outwardly from the upstanding wall 15d' of the vessel 11'. Formed in the flange 52 is a horizontal slot 53. When the cover 12' is seated on the vessel 11', a projection or tongue 54 on the cover 12' is received by the slot 53. When the cover 12' is placed over the vessel 11' for seating thereon, the projection 54 is first placed in the slot 53. When the cover 12' is to be lifted from the vessel 11', the projection 54 is removed from the slot 53 as the last step in lifting the cover 12' from the vessel 11'.

The cover 12' is formed with a projection or flange 55, which is diametrically opposite from the horizontal flange 52. Formed in the projection 55 are slots 56 and 57. Diametrically opposite the horizontal flange 52, the wall 15b' of the vessel 11' is formed with an upstanding 10 projection 60. When the cover 12' is seated on the vessel 11', the projection 60 is received by the slot 57. To removably secure the cover 12' to the vessel 11', the hollow member 51 is removably attached to the generally upright wall 15b'. Toward this end, the hollow member 51 is formed with an opening 62. The hollow member 51 also includes a downward projection 63 that enters the opening 62. For latching the cover 12' to the vessel 11', the projection 63 of the hollow member 51 is received by the slot 56 of the cover 12'. The upper 20 section of the removable hollow member 51 is pivoted outwardly until the lower section of the hollow member 51 engages an abutment 65 on the wall 15b' of the vessel 11'.

In the removable seating of the cover 12' on the vessel 11', the tongue 54 is inserted into the slot 53. The cover 12' is then pivoted toward the vessel 11'. The downwardly directed projection 60 on the vessel 11' is received by the slot 56 of the cover 12'. The removable hollow member 51 is disposed so that the downwardly directed projection 63 thereof is received by the slot 56 of the cover 12' and the flange 55 is received by the opening 62. The latch 51 is moved so that the lower section thereof engages the wall 15b' of the vessel 11'. To lift the cover 12' from the vessel 11', the hollow member 51 is moved so that the downwardly directed projection 63 is removed from the slot 56 and the flange 55 is removed from the opening 62. The cover 12' is then lifted to remove the upwardly directed projection on the vessel 11' from the slot 56 on the cover 12'. Lastly, the tongue 54 on the cover 12' is removed from the slot 53 in the flange 52 of the vessel 11'.

It is believed that snails feed while it is dark and, thus, the bait holder and trap 10 provides a dark bait holding chamber 14 to attract snails during the daytime to feed on the bait granules. Additionally, it is believed that ultra violet light has a degradation effect on the bait granules, which is lessened by the bait granules being disposed in the dark bait holding chamber 14.

What is claimed is:

1. A bait holder comprising:
   (a) a vessel;
   (b) a cover overlying said vessel to form a. bait chamber;
   (c) a hollow member attached to said vessel, said hollow member being formed with a horizontal slot;
   (d) a tongue on said cover removably insertable into said horizontal slot of said hollow member;
   (e) a first horizontal flange on said cover disposed diametrically opposite from said tongue on said cover;
   (f) a pin projecting downwardly from said first flange on said cover at right angles thereto, said pin having a radial bore;
   (g) a second horizontal flange on said vessel disposed diametrically opposite from said hollow member on said vessel, said second horizontal flange having an aperture therein in which said pin is insertable; and
   (h) a fastener insertable into said radial bore of said pin for removably securing said cover to said vessel,
   (i) said vessel being formed with an opening to provide access to bait in said bait chamber.

2. A bait holder as claimed in claim 1 wherein said hollow member is fixedly attached to said vessel.

3. A bait holder comprising:
   (a) a vessel;
   (b) a cover removably seated on said vessel to form a bait chamber;
   (c) a first horizontal flange projecting from said vessel, said first horizontal flange having a first slot;
   (d) a tongue on said cover received by said first slot in said first horizontal flange when said cover is seated on said vessel;
   (e) a second horizontal flange projecting from said cover, said second horizontal flange being diametrically opposite from said tongue on said cover, said second horizontal flange being formed with a second slot and a third slot;
   (f) a third horizontal flange projecting from said vessel, said third horizontal flange being diametrically opposite from said first horizontal flange projecting from said vessel;
   (g) an upright projection on said third horizontal flange received by said second slot of said second horizontal flange when said cover is seated on said vessel;
   (h) a removable latch for removably securing said cover to said vessel when said cover is seated on said vessel, said latch being formed with an opening; and (i) a downwardly directed projection on said latch disposed within said opening of said latch, said downwardly directed projection on said latch being received by said third slot formed in said second horizontal slot when said upright projection on said third horizontal flange is received by said second slot of said second horizontal flange and when said third horizontal flange is received by said opening in said latch, (j) said vessel being formed with an opening to provide access to bait in said bait chamber.

* * * * *